May 29, 1956   W. A. ECKLEY   2,747,418
GYRATORY DEVICE

Filed Oct. 7, 1954   3 Sheets-Sheet 1

INVENTOR.
William A. Eckley
BY
Murray G. Gleeson
ATTORNEY

May 29, 1956　　　W. A. ECKLEY　　　2,747,418
GYRATORY DEVICE

Filed Oct. 7, 1954　　　　　　　　3 Sheets-Sheet 2

INVENTOR.
William A. Eckley
BY
Murray A. Gleeson
ATTORNEY

2,747,418

GYRATORY DEVICE

William A. Eckley, Palos Heights, Ill., assignor to Goodman Manufacturing Company, Chicago, Ill., a corporation of Illinois Application October 7, 1954, Serial No. 460,802

10 Claims. (Cl. 74—87)

This invention relates generally to devices for vibrating the screens used to sort different sizes of gravel, crushed stone or the like, and more particularly to improvements in devices for vibrating such a screen whereby the amplitude of movement thereof is made substantially constant irrespective of its loaded condition.

Mechanical vibration of gravel screens can ordinarily be achieved by rotating an eccentric weight coupled to a shaft upon which the screen is also mounted eccentrically. The screen, which is much heavier than the eccentric weight, has a small amplitude of movement substantially in the form of a circle, while the weight moves through a relatively large circle. Under conditions when the screen is heavily loaded its amplitude of movement is reduced, and the eccentrically mounted weight, instead of having a fixed point for its rotation, turns about a point having orbital movement. The work output from the prime mover serves in such cases no useful function since it merely moves the weight in an orbital path rather than the screen.

According to the present invention, the tendency of the vibrating screen to stall under an excess of load is corrected by moving a number of auxiliary weights upon a flywheel in such a fashion as to cause the flywheel to maintain its rotation about a fixed center. Conversely, when the screen is underloaded, tending to make screen move in a larger orbit of travel, with the flywheel also moving in an unintended orbit rather than upon a fixed center of rotation, the same weights move in an opposite direction upon the flywheel to cause the flywheel to return to a condition of rotation about a fixed center.

In a preferred form of the invention, the flywheel is mounted eccentrically on the shaft, which is arranged to rotate as an eccentric about the geometric center of the flywheel. The flywheel is provided with a raceway for movable weights preferably in the form of freely turning rollers which move in directions so as to overcome any tendency of the screen to deviate from the normal orbit of movement, such weights moving in a direction to augment the eccentric mass of the flywheel when the orbit of movement of the screen tends to decrease, and moving in an opposite direction to decrease the effect of the eccentric mass when the orbit of movement of the screen tends to increase. The raceway for the moving weights in this form of the invention is of a circular form with its center corresponding to the geometric center of the flywheel and not the center of the shaft upon which the flywheel is mounted.

In another form of the invention, the vibrating screen is mounted upon an eccentric throw of a shaft having its ends mounted with a flywheel. The flywheel in this instance is mounted concentrically on the shaft and is provided with eccentric weights so related to the mass of the screen and its eccentricity that the screen moves in an orbital path with the center of the shaft ends as the center of orbital movement. In this instance also, the flywheel has circular races for the moving weights, the center of the races corresponding to the center of the shaft end.

As in the former case, the weights are movable in the races to augment the action of the fixed eccentric weight of the flywheel when the screen tends to move with a smaller amplitude, and are also movable in an opposite direction to decrease the effect of the eccentric weight when the orbit of movement of the screen tends to increase.

In either case, the races are made in two distinct portions with abutments at the ends of each to provide a stop for the moving weights when the flywheel is accelerating up to working speed.

However, these annular races may be closed against leakage, and each may be filled with a heavy liquid such as mercury. Whatever the liquid, its function is the same as the moving weights, and it also adopts positions against the aforementioned stops or abutments where the flywheel is accelerating. Suitable baffles may be provided in the races in such an embodiment of the invention to prevent unintended sloshing of the mercury.

In any of the foregoing cases, the structures according to the present invention may be regarded as having the following features in common: (1) A pair of stops disposed 180° apart for the shifting counterweights, (2) weights movable upon a circular race or track having its center corresponding to the geometric center of the flywheel, and also having its center on the line passing through the 180° apart stops, (3) a flywheel having its center of gravity on the same line, (4) a screen having orbit of gyrating movement measured by an eccentric distance along the aforesaid line opposite the center of gravity of the flywheel and measured from the geometric center of the flywheel.

It is contemplated, however, in a possible but less desirable form of the invention, that the moving weights be arranged upon arms which swing about the true geometric center of the flywheel, such arms being mounted upon a stub shaft extending from the geometric center of the flywheel. Such form is not as desirable as the forms described in more detail herein, because of the untoward amount of friction upon such supports, arising from the centrifugal forces involved, which would possibly restrain the movement of the weights in a proper direction. In such a form, however, the weights would not be restrained in their movement by springs, but would engage the 180° apart stops, as previously described, in the period of acceleration.

With the foregoing considerations in mind it is a principal object of this invention to provide an improved vibrating screen where the desired amplitude of movement of the screen is maintained irrespective of the load condition of the screen.

Another object is to provide a construction for driving a vibrating screen at a substantially fixed amplitude of movement, and wherein the means for attaining such fixed amplitude is wholly automatic and contained within the means for transmitting power from a prime mover into the screen.

Other objects and important features of the invention will be apparent from a study of the following specification taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, other embodiments being intended to be reserved especially as they fall within the scope and purview of the appended claims.

In the drawings illustrating a preferred embodiment of the invention:

Figure 5:
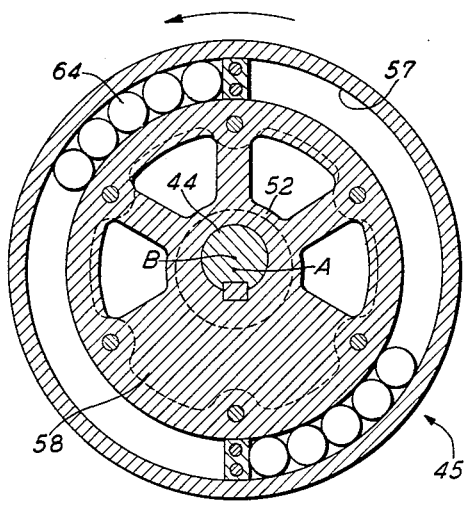
Fig. 5 is a view similar to Fig. 3, to a different scale, but showing the position of movable counterweights of the flywheel, said counterweights being shown in the condition when the flywheel and the vibrating screen are accelerating from rest to normal running speed.
Figure 6:
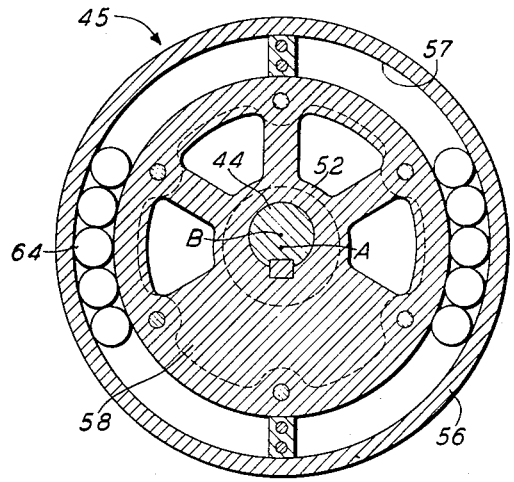
Fig. 6 is a view similar to Fig. 5 but showing the position of the counterweights when the screen is normally loaded and is moving in its normal amplitude.
Figure 7:
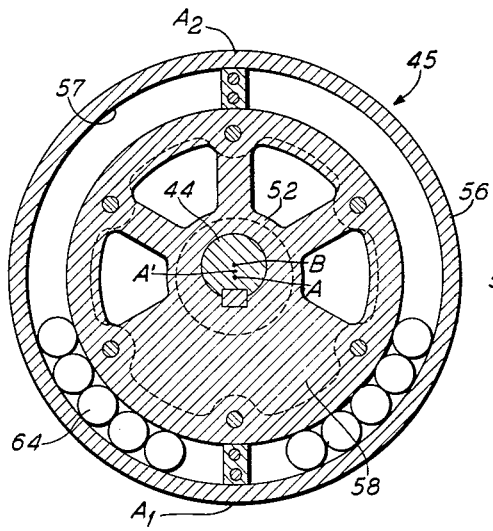
Figure 8:
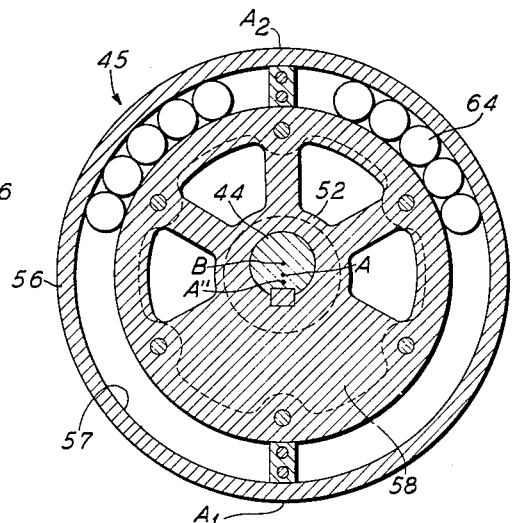

Fig. 7 is a view similar to Figs. 5 and 6, but showing the position of the movable counterweights when the screen is overloaded and its amplitude of movement is less than the desired value, said counterweights being shown as having moved to a position to correct for the lessened amplitude of movement of the screen; and Fig. 8 is a view similar to Fig. 7 and showing the position of the counterweights in correcting for a condition of underload of the vibrating screen, when the amplitude thereof increases beyond a predetermined value, the movement of the counterweights to the position shown in Fig. 8 correcting such increased amplitude of the screen.

Figure 1:
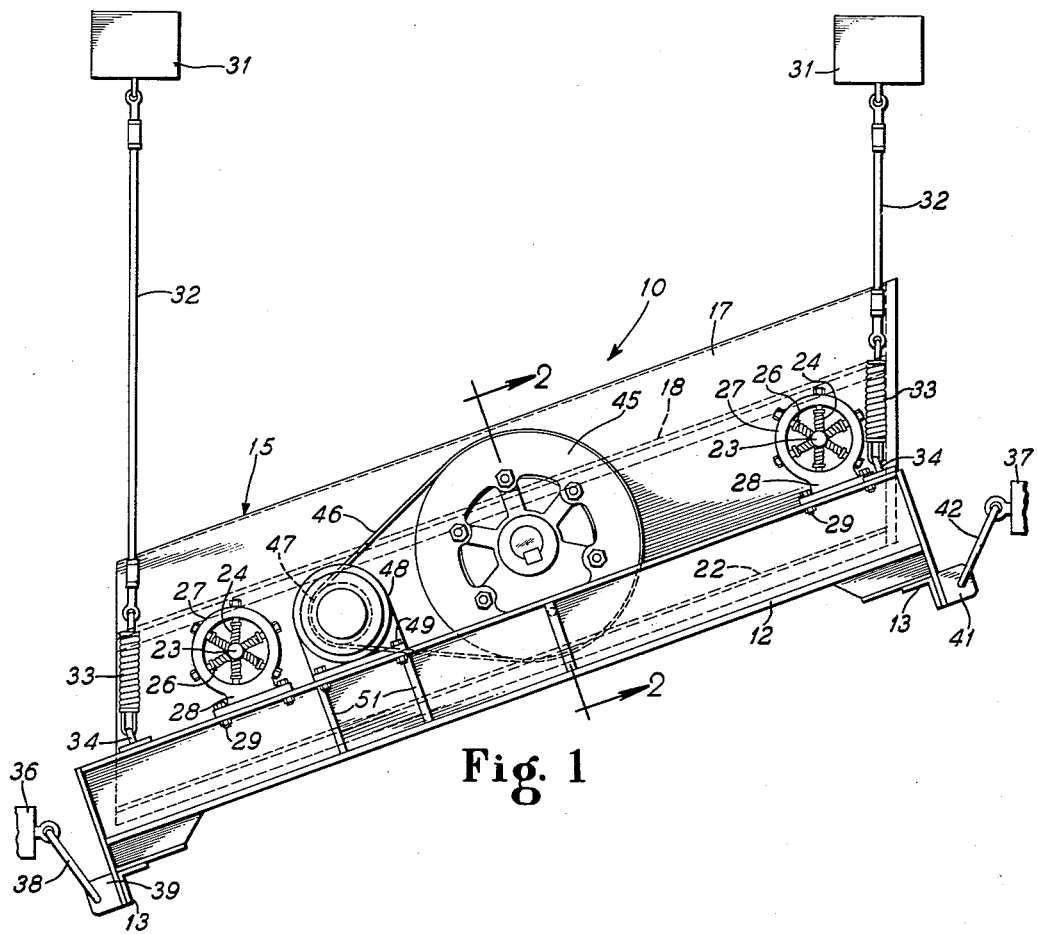
Fig. 1 is a side elevation view of a vibrating screen having the improvements according to the present invention embodied therein.
Figure 2:
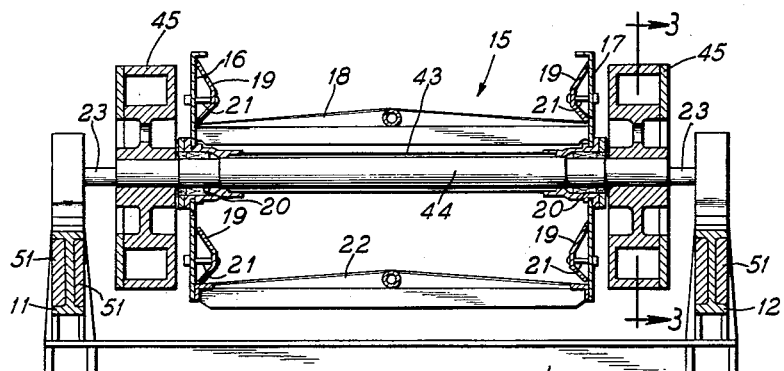
Fig. 2 is a section taken through the vibrating screen along the line 2—2 of Fig. 1 and looking in the direction of the arrows.

Referring now particularly to Figs. 1 and 2 of the drawings, the improved vibrating screen assembly according to the present invention is indicated generally by the reference numeral 10. It includes a support frame consisting of laterally spaced I-beam members 11 and 12 which are maintained in proper spaced relationship by means of a plurality of transversely extending members 13.

The frame work thus far described supports a vibrating screen indicated generally by the reference numeral 15 and consisting of laterally spaced vertical side plates 16 and 17. These vertical side plates 16 and 17 are spanned by an upper screen deck 18 held in position by locking plates 19, 19 which are arranged to stretch the screen of the upper screen 18, and arranged to be held in position by means of bolts 21 passing through the side walls 16 and 17.

The vibrating screen 15 also includes a lower screen deck 22, the screen thereof being similarly held in position by the locking plates 19, 19 and the through bolts 21. The number of screen decks has no bearing on the scope of the invention, and as many as four decks may be employed if desired.

As will be described in more detail as this specification proceeds, the screen is given a vibrating movement through a circular orbit of travel, and the movement thereof in such circular orbit is restrained through the means of stub members 23 extending from the outer sides of the vertical side plates 16 and 17. These stub members 23 bear against radially extending compression springs 24 which are adjusted in their load by means of adjusting members 26 threaded into a ring 27 having a base portion 28 held to the upper flange of the I-beam members 11 and 12 by means of through bolts 29.

It is believed clear that the vibrating screen 15 may thus have any desired oscillatory movement, the translation of the screen 15 in any direction in the plane of the side plates 16 and 17 being limited by the springs 24.

The entire assembly thus far described is suspended from horizontal beams 31, each beam having secured thereto flexible cables 32, each of which is connected to a spring 33 anchored at 34 to each end of the I-beams 11 and 12. The entire mechanism is suspended from the cables 32 in the canted position shown so that material can be distributed across the screen and move from the top toward the bottom thereof. The entire mechanism may thus have a limited amount of vertical movement and a limited amount of pendular movement to accommodate its vibration.

Alternately, the screen assembly 10 may be suspended from spaced abutments 36 and 37, abutment 36 being connected through the medium of a shackle 38 to a place of connection 39 upon the lower side of the I-beams 11 and 12 and at the lower ends thereof. The opposite end of the I-beams 11 and 12 may alternately also have a point of connection 41 to shackles 42 connected to the fixed abutment 37.

Means are provided for imparting vibratory motion in a closed circular path to the screen 15, and to this end the spaced vertical side plates 16 and 17 are spanned by a shaft housing 43 having a shaft 44 turning therewithin. Shaft 44 is supported in the side plates 16 and 17 upon bearings 20. In the form of the invention shown in Fig. 2, the shaft 44 has mounted at each end thereof a flywheel indicated generally by the reference numeral 45 and driven along its periphery by means of V-belting 46 trained around the drive pulley 47 of a drive motor 48.

Alternately, however, a separate V-belt sheave may be mounted on the pulley 47 and driven by the motor 48.

As seen in Fig. 1, the drive motor 48 is mounted on the upper flange of the I-beams 11 or 12 and is held thereto by means of through bolts 49. Additional stiffening members 51 for mounting of the motor 48 may also be provided for as seen in Figs. 1 and 2.

Figures 3, 4:
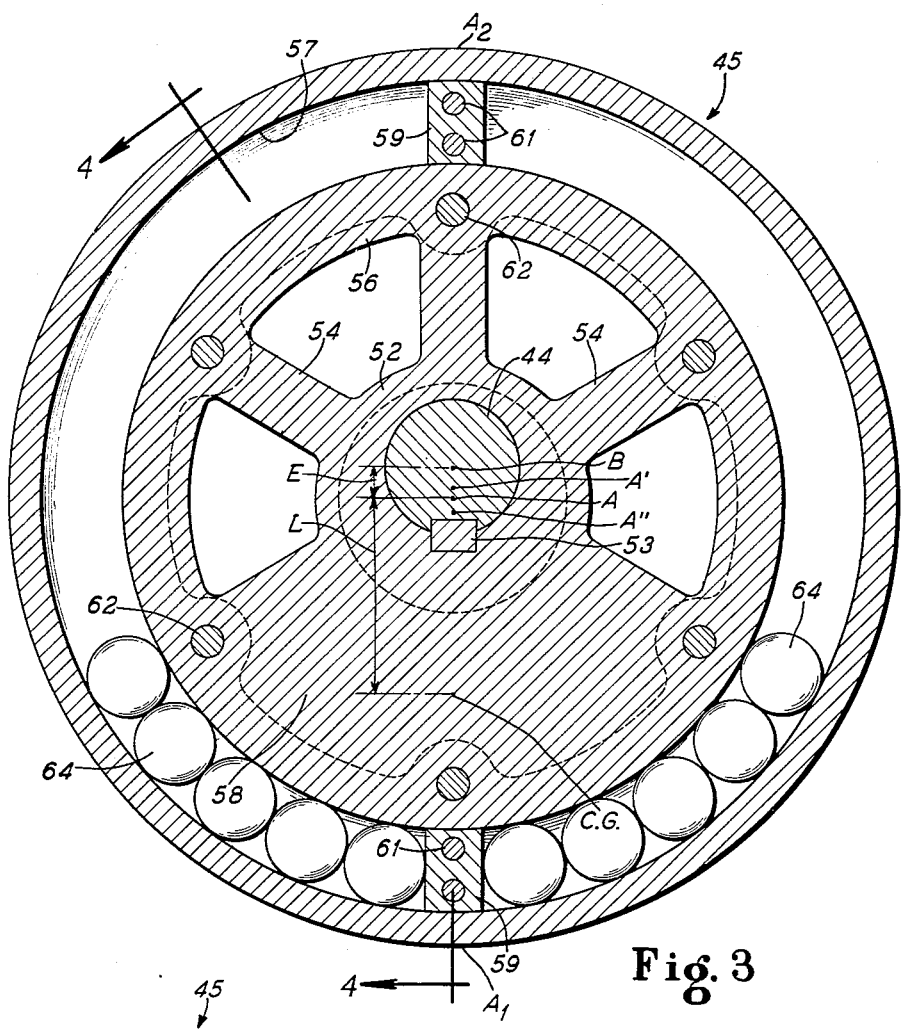
Fig. 3 is a sectional view, to a larger scale, of a flywheel forming an important part of the invention herein, said view being taken along the line 3—3 of Fig. 2 and looking in the direction of the arrows.
Fig. 4 is a sectional view taken through the flywheel along the line 4—4 of Fig. 3 and looking in the direction of the arrows.

Referring now to Figs. 3 and 4 of the drawings the flywheel 45 has a hub 52 which is keyed to the shaft 44 as by the key 53. As seen in Fig. 3, the flywheel 45 is symmetrical about a point A, but is mounted eccentrically with respect to the shaft 44 which has a center B. The flywheel has spokes 54 which extend radially to a rim 56 having an annular raceway 57 therein of essentially rectangular cross section as seen in Fig. 4. As seen in Fig. 3, certain of the spokes 54 are cast integrally with a counterweight 58.

The annular raceway 57 has two abutments 59, see also Fig. 4, which are disposed in positions 180° apart, and held in place by through bolts 61, said through bolts also cooperating with through bolts 62 to hold in place a cover plate 63 forming a closure for the raceway 57.

The raceway 57 is accordingly divided into two equal portions each of which contains an equal number of movable counterweights 64. These may be in the form of balls if desired, but in the embodiment herein are in the form of cylinders arranged to roll freely within the annular raceways 57.

The flywheel 45 and the motor 48 are arranged to drive the vibrating screen 16 with an oscillatory motion in a closed orbit. Desirably, the entire flywheel turns upon its center A while the screen moves in an orbit with a radius E about the center A, E being the distance between the center B of the shaft 44 and the turning center A of the flywheel 45.

The counterweight 58 of the flywheel 45 may be considered with the flywheel as having its centroid at a point C. G. spaced a distance L from the center A. The relationship between the mass of the vibrating screen, its eccentricity, and the mass of the flywheel 45 concentrated at its centroid, C. G. and its eccentricity L with respect to the center A may be stated as follows.

$$(W \text{ vibrating screen}) \cdot E = (W \text{ flywheel}) \cdot L$$

It is believed apparent that the rotational inertia of the flywheel 45 may thus be transferred into the screen 15, and under the normal loaded condition of the screen 15 the flywheel will turn about its true center A while the screen 15 is moving in an orbital path described by the point B moving about the point A in a closed circle.

However, the condition described is an optimum one when the screen has attained proper running speed and is normally loaded. But the optimum condition described does not obtain when the screen is accelerating to its normal operating speed, and also when the screen is overloaded or underloaded. The condition of overloading, for example, will cause the screen 15 to be moved with a smaller amplitude, while the flywheel 45 at the same time moves orbitally, both bogging down the screen and causing large unintended vibrations by reason of the orbital movement of the large mass of the flywheel 45. In the condition of underloading the screen tends to go through an orbit of larger amplitude and the true turning center of the flywheel 45 will also be shifted causing it to go through an orbit thereby causing large unintended vibrations.

To obviate these conditions, the moving counterweights 64 shift in accordance with the conditions of acceleration of the entire device to proper running speed, and in accordance with both underloading and overloading.

For example, and now referring to Fig. 5 of the drawings, there is shown the condition obtaining for the movable counterweights 64 during acceleration of the flywheel 45 to proper speed. When the screen is being started from a condition of rest, the inertia of the counterweights 64 will cause them to adopt positions against their respective abutments 59 as shown.

When the screen has reached its proper running speed, the flywheel 45 will be turning on its center A while the shaft 44 will move orbitally with the screen 15 about the center A. The annular raceway 57 is, of course, at a constant distance from the center A, and the counterweights 64 will adopt the position as seen in Fig. 6, whereby their effect will be substantially nullified, and the eccentric mass 58 of the flywheel 45 alone will be effective to keep the screen 15 movable in its proper orbital path. The counterweights 64 need not be grouped together, as shown, but may be spaced about their separate races.

Consider now the condition obtaining when the screen is overloaded. The greater mass to be moved by the screen will thus tend to lessen its amplitude of movement for a given output from the driving motor 48. As seen in Fig. 7, such overloading of the screen tends to make the flywheel turn in an orbital fashion rather than about the fixed center A. The flywheel may thus be considered to be instead turning about a point A' as seen in Figs. 3 and 7. This causes a point $A_1$ on the rim of the flywheel 45 to be further from the point A' than an opposite corresponding point $A_2$ on the flywheel 45. Since the raceways 57 under this condition of operation are eccentric with respect to the now turning center A', the movable counterweights 64 will be affected by centrifugal force to move to the position as seen in Fig. 7 thereby augmenting the effect of the eccentric mass 58. Such movement of the movable counterweights 64 will restore the flywheel back to its fixed turning center A as seen in Figs. 3 and 6, the relationship now existing between the screen and the flywheel and their eccentricities prior to such correction being stated as follows:

($W$ vibrating screen+overload) · (distance $B$ to $A'$) =
  ($W$ flywheel+counterweights 64) ($L$+distance $A$ to $A'$)

Consider now the condition obtaining when the screen 15 is underloaded tending to make the point B of the shaft 44 move through a larger orbit. Referring now to Figs. 3 and 8, the point B of the shaft 44 will now tend to travel in a larger orbit with point A'' as a center. Under such condition the flywheel is rotating eccentrically and the distance from A'' to the point $A_1$ on the flywheel is less than the distance from A'' to the opposite diametral point $A_2$ on the flywheel. Since the annular raceways 57 under this condition are not concentric with the new center of rotation A'' the moving counterweights 64 will move in the direction seen in Fig. 8 to subtract from the effect of the eccentric mass 58 of the flywheel 45, thereby correcting the tendency of the screen 15 to move in a larger orbit of travel, and to thereby return the system back to the condition of normal operation as shown in Fig. 6. The relationship obtaining between the vibrating screen and the flywheel and their eccentricities may be stated as follows:

($W$ underloaded screen 15) · ($E$+distance $A$ to $A''$) =
  ($W$ flywheel−counterweights 64) ($L$−distance $A$ to $A''$)

It is believed apparent that the action of the moving counterweights 64 is such as to correct for both underloading and overloading of the vibrating screen 15.

Throughout the normal range of operating loads the flywheel 45 at all times will rotate upon a fixed center while the vibrating screen will move through its proper orbit. The tremendous vibrations occurring by reason of the fact that the flywheel has not heretofore been so compensated are thereby avoided, and the entire output from the drive motor 48 performs useful work of vibrating the screen within prescribed limits rather than vibrating the means for supporting the screen.

The invention has been described in terms of an embodiment where a shaft of uniform diameter may be caused to move in an orbital path, the shaft having mounted thereon an eccentric flywheel. However, it is entirely within the scope of the invention that the flywheel be mounted concentrically on eccentric stub portions of the shaft, such a flywheel having eccentric weights and movable counterweights as previously described. In such other embodiment the theory underlying the operation is analagous, and it is not believed necessary to describe in detail such other possible embodiment.

It is believed apparent that the moving counterweights 64 are free at all times to move to proper positions for their correcting function. There are no springs opposing their movement, they furthermore are enabled to move with a minimum of frictional resistance by rolling action in their raceways. While in the conditions of underloading and overloading of the screen they are shown as being grouped together, it is entirely possible that they may adopt positions other than being grouped together.

It is believed apparent that the raceways may also be adapted to retain a heavy fluid such as mercury for the same function as the moving weights 64. In such case the raceways or guides would preferably also be constructed with the center corresponding to the geometric center of the flywheel.

By analogy, a pair of weights pivoted at the geometric center of the flywheel might also be employed. However, such an embodiment probably would not be as sensitive in correction as the described embodiment by reason of friction at the points of pivotal support of such moving weights.

While the invention has been described in terms of an embodiment more suitable commercially, the scope of the invention is not intended to be limited by the precise embodiment herein shown, nor otherwise than by the terms of the claims here appended:

I claim as my invention:

1. Means for vibrating a body in an orbital path having an amplitude which is substantially uniform regardless of the condition of loading of said body, comprising a shaft describing an orbital path about an axis of gyration in its rotation, said body being mounted on said shaft for orbital movement therewith, a flywheel mounted on said shaft eccentrically thereof and during normal loading of said body rotating upon a center corresponding to the center of the orbit of movement of the body, and means operable when the center of rotation of said flywheel moves in an orbital path to return said center to a position of non-orbital movement comprising a pair of opposed semi-circular races on said flywheel and having their center corresponding to the geometric center of said flywheel, and at least one freely movable weight in each of said races movable in a corrective direction.

2. Means for vibrating a body in an orbital path having an amplitude which is substantially uniform regardless of the condition of loading of said body, comprising a shaft describing an orbital path about an axis of gyration in its rotation, said body being mounted on said shaft for orbital movement therewith, a flywheel mounted on said shaft eccentrically thereof and during normal loading of said body rotating upon a center corresponding to the center of the orbit of movement of the body, and means operable when the center of rotation of said flywheel moves in an orbital path to return said center to a position of non-orbital movement comprising a pair of essentially semi-circular races on said flywheel and having their center corresponding to the geometric center of said flywheel, and weights movable in said races in a corrective direction.

3. Means for vibrating a body in an orbital path having an amplitude which is substantially uniform regardless of the condition of loading of said body, comprising a shaft describing an orbital path about an axis of gyration in its rotation, said body being mounted on said shaft for orbital movement therewith, a flywheel mounted on said shaft eccentrically thereof and during normal loading of said body rotating upon a center corresponding to the center of the orbit of movement of the body, and means operable when said flywheel moves in an orbital path to return said center to a position of non-orbital movement comprising a pair of races on said flywheel, and weights movable in said races in a corrective direction.

4. Means for vibrating a body in an orbital path having an amplitude which is substantially uniform regardless of the condition of loading of said body, comprising a shaft describing an orbital path about an axis of gyration and having said body mounted thereon for movement in a corresponding orbital path, a flywheel mounted on said shaft and having an eccentric weight mounted thereon, said flywheel being arranged to rotate on said axis of gyration during the normal loaded condition of said body, and means operable when the center of rotation thereof tends to move in an orbital path to return said center to a position of non-orbital movement comprising a circular race having a center corresponding to the geometric center of said flywheel, abutments in said race spaced 180° apart, at least one freely movable weight in each semi-circular race portion to augment or subtract from the effect of said eccentric weight in accordance with the condition of loading of said body, said abutments providing restraint against movement of said weights during acceleration of said flywheel.

5. Means for vibrating a body in an orbital path having an amplitude which is substantially uniform regardless of the condition of loading of said body, comprising a shaft describing an orbital path about an axis of gyration and having said body mounted thereon for movement in a corresponding orbital path, a flywheel mounted on said shaft and having an eccentric weight mounted thereon, said flywheel being arranged to rotate on said axis of gyration during the normal loaded condition of said body, and means operable when the center of rotation of said flywheel tends to move in an orbital path to return said center to a position of non-orbital movement comprising a circular race having a center corresponding to the geometric center of said flywheel, abutments in said race spaced 180° apart, weights movable in said semi-circular race to augment or subtract from the effect of said eccentric weight in accordance with the condition of loading of said body.

6. Means for vibrating a body in an orbital path having an amplitude which is substantially uniform regardless of other conditions of loading of said body, comprising a shaft describing an orbital path about an axis of gyration and having said body mounted thereon for movement in a corresponding orbital path, a flywheel mounted on said shaft, said flywheel being arranged to rotate on said axis of gyration during the normal loaded condition of said body, and means operable when the center of rotation of said flywheel tends to move in an orbital path to return said center to a position of non-orbital movement comprising a pair of opposed semi-circular races on said flywheel and having their center corresponding to the geometric center of said flywheel, and at least one freely movable weight in each of said races movable in a corrective direction.

7. Means for vibrating a body in an orbital path having an amplitude which is substantially uniform regardless of the condition of loading of said body, comprising a shaft describing an orbital path about an axis of gyration and having said body mounted thereon for movement in a corresponding orbital path, a flywheel mounted on said shaft, said flywheel being arranged to rotate about said axis of gyration during the normal loaded condition of said body, and means operable when the geometric center of said flywheel tends to move in an orbital path to return said center to a position corresponding to said axis of gyration comprising a pair of semi-circular races on said flywheel and having their center corresponding to the geometric center of said flywheel, and weights movable in said races in a corrective direction.

8. Means for vibrating a body in an orbital path having an amplitude which is substantially uniform regardless of the condition of loading of said body, comprising a shaft describing an orbital path about an axis of gyration and having said body mounted thereon for movement in a corresponding orbital path, a flywheel mounted on said shaft, said flywheel being arranged to rotate about said axis of gyration during the normal loaded condition of said body, and means operable when the geometric center of said flywheel tends to move in an orbital path to return said center to a position of non-orbital movement comprising a pair of races on said flywheel, and weights movable in said races in a corrective direction.

9. Means for vibrating a body in an orbital path having an amplitude which is substantially uniform regardless of the condition of loading of said body, comprising a shaft supporting the body for orbital movement about an axis of gyration; a counterweight for said body including means for supporting said counterweight on said shaft; supplementary counterweight means comprising a race supported by said shaft and concentric with said axis of gyration; abutments in said race spaced 180° apart and freely movable weight means in the race portions defined by said abutments movable in directions to vary the counterweighting effect to compensate for varying loads on said body, said abutments providing restraint against movement of said weights during acceleration of said body.

10. Means for vibrating a body in an orbital path having an amplitude which is substantially uniform regardless of the condition of loading of said body, comprising a shaft supporting the body for orbital movement about an axis of gyration; a counterweight for said body including means for supporting said counterweight on said shaft; supplementary counterweight means comprising a race supported by said shaft and concentric with said axis of gyration; and freely movable weight means in said race movable in directions to vary the counterweighting effect to compensate for varying loads on said body.

References Cited in the file of this patent
UNITED STATES PATENTS

| | | |
|---|---|---|
| 2,192,420 | Stroud | Mar. 5, 1940 |
| 2,528,620 | Stroud | Nov. 7, 1950 |